United States Patent [19]

Kurakami et al.

[11] 4,358,794
[45] Nov. 9, 1982

[54] FACSIMILE AND SIMILAR APPARATUS EMPLOYING A PLURALITY OF SOLID-STATE IMAGE SCANNERS

[75] Inventors: Naoki Kurakami; Tetsuya Takahashi; Etsuo Suzuki, all of Tokyo, Japan

[73] Assignee: Nippon Electric Co., Ltd., Tokyo, Japan

[21] Appl. No.: 176,804

[22] Filed: Aug. 11, 1980

[30] Foreign Application Priority Data

Aug. 15, 1979 [JP] Japan .............................. 54-104251

[51] Int. Cl.³ .................... H04N 1/10; H04N 1/38; H04N 1/40
[52] U.S. Cl. .................................. 358/293; 250/578; 358/294
[58] Field of Search ................ 358/285, 293, 294; 340/146.3 H, 146.3 F; 235/454; 250/208, 578

[56] References Cited

U.S. PATENT DOCUMENTS

4,249,217  2/1981  Korte et al. .................... 358/294

Primary Examiner—Joseph A. Orsino, Jr.
Attorney, Agent, or Firm—Laff, Whitesel, Conte & Saret

[57] ABSTRACT

Appearance of joints between partly overlapping picture signal segments from a plurality of solid-state image scanners can be effectively avoided by means of automatically phase-setting the scan start signals for the respective image scanners relative to each other so that the logical sum signal of the marker signals contained in the respective signal segments is minimized in width. The marker as a source of the marker signals is fixedly arranged on the original-copy supporting table or separately therefrom in the region of overlap of the scan ranges of adjacent image scanners.

11 Claims, 7 Drawing Figures

FACSIMILE AND SIMILAR APPARATUS EMPLOYING A PLURALITY OF SOLID-STATE IMAGE SCANNERS

BACKGROUND OF THE INVENTION

1. Field of the Invention

This invention relates to facsimile and similar apparatus employing solid-state image scanner means and more particularly to such apparatus of the type including a plurality of solid-state image scanners and automatic means for correcting the location of a joint or junction between the picture signals of adjacent image scanners.

2. Description of the Prior Art

Recently, production for commercial applications of solid-state image scanner units of the CCD (charge coupled device), BBD (bucket-brigade device), MOSIC or the like has increased. As a result, plane-scane facsimile apparatuses are becoming prevalent in practical applications. These types of solid-state image scanners usually include either 1,024 or 2,048 bits of photoelements. Accordingly, facsimile apparatuses employing such image scanner means are subject to a definite limitation as to the resolution of picture elements. Under this situation, a method for enabling picture reproduction at the receiver end with an improved resolution has been proposed, in which a plurality of solid-state image scanners are arranged to share each main scan of the original copy with each other (see Japanese Patent Application No. 132,505/77, now open to public inspection as Japanese Laid-open Patent Application No. 66017/54 (1979)).

According to this application, the solid-state image scanners are arranged so that their scan ranges partly overlap each other. These scanners are fed with scan start pulse signals which are preliminarily set in phase according to the spatial arrangement of the image scanners. In writing the picture signal segments from the respective solid-state image scanners in a line memory, the write-in clock is blocked for the duration of the overlap of the scan ranges of adjacent image scanners. That is, the scan start pulse signals are prefixed in phase at the manufacturing stage, in accordance with the spatial arrangement of the solid-state image scanners, to prevent an appearance of any overlapped signal joint or junction within each one-scan-line picture signal.

Such a preadjustment is intended to prevent an occurrence of a seam or seams in the picture which is received. However, such a preadjustment has been found unsatisfactory as the relative spatial arrangement of the CCD image scanners is subtly disturbed with changes in temperature within the apparatus and these changes cause an appearance of a seam or seams in the picture, as received.

SUMMARY OF THE INVENTION

Under the circumstances, the present invention has for its object the provision of an improved facsimile or similar apparatus of the described type which is capable of picture transmission with no overlapped images or seams, even with secular change of the image scanners.

According to the present invention, a facsimile or similar apparatus includes a plurality of solid-state image scanners arranged so that their scanning ranges partly overlap each other. Scan start signals order the respective solid-state image scanners to start scanning, the scan start signals being pulse signals of the same rate of repetition and different in phase from each other. The output picture signal segments are combined in synchronism with a reference clock pulse signal by the respective solid-state image scanners, to form a one-scan-line picture signal. A density marker is arranged at a fixed location corresponding to that of the overlap of the scan ranges of adjacent solid-state image scanners, and having a predetermined width. Marker signals are extracted from the picture signal segments from the respective solid-state image scanners. Each marker signal corresponds in location to the density marker. The logical sum signal of the marker is formed from the respective solid-state image scanners. The phase of the scan start pulse signals is set to minimize the width of the logical sum signal.

On account of the characteristic features of the present invention, the formation of overlapped picture junctions or joints between segments of each one-scan-line picture signal can be corrected whenever required. Such a correction can be made for each original copy that is transmitted with no doubling or missing of the picture signal at the joint.

The above and other objects, features and advantages of the present invention will become apparent from the following description when taken in conjunction with the accompanying drawings.

DESCRIPTION OF THE PREFERRED EMBODIMENTS

Figure 1:
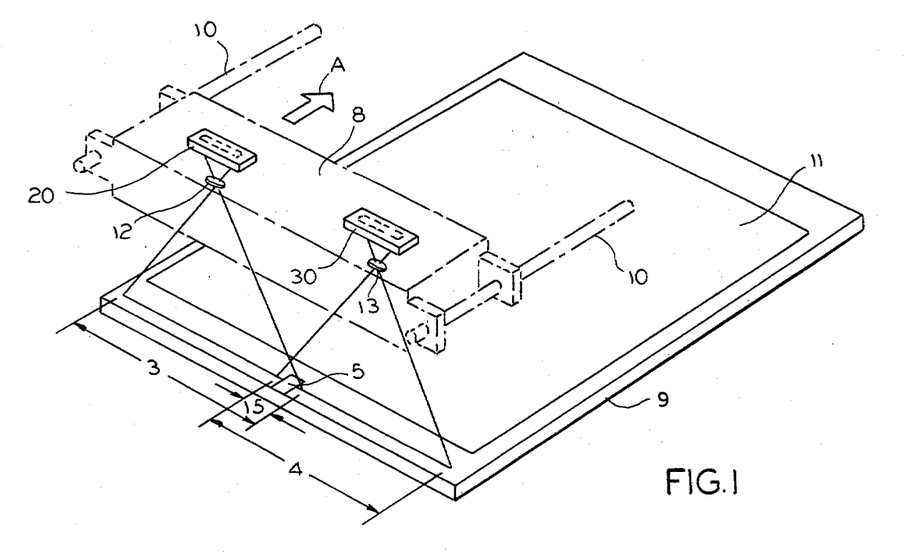
FIG. 1 is a perspective view of the image pick-up section of a facsimile transmitter device embodying the present invention.

In FIG. 1, reference numeral 9 indicates an original supporting table on which an original copy 11 is placed to be scanned for transmission. Centrally arranged at one end of the table 9 is a density marker 5. The marker 5 is black and is formed on the table 9 with a predetermined width, as by a printing process.

Arranged over the original supporting table 9 is a scanning platform 8 on which two CCD image scanners 20 and 30 are arranged, as shown. Reference numerals 3 and 4 indicate the respective scan ranges of image scanners 20 and 30. The lenses 12 and 13 focus the regions of the original copy or image area 11 which are covered thereby onto the photoelectric faces of the respective image scanners.

As observed, the scan ranges 3 and 4 partly overlap each other over a length 15, which represents a region of the original copy which is scanned by both of the two image scanners 20 and 30. The main scanning of the original copy or image area 11 on the table 9 is effected by electrically controlling the two image scanners 20 and 30, whereas the auxiliary scanning in the direction at right angles to the main scanning is effected by moving the scanning platform 8 along guide rods 10, in the direction of the arrow A. The scanning platform 8 is returned to its starting position (i.e., the position where the marker 5 is picked up) each time transmission of an original copy is completed. The timing of the scan start pulse signals for the CCD image scanners is automatically adjusted. Therefore, at the starting position of the scanning platform 8, the picture signal outputs of the CCDs are smoothly joined together, as will be described later in detail.

Figure 2:
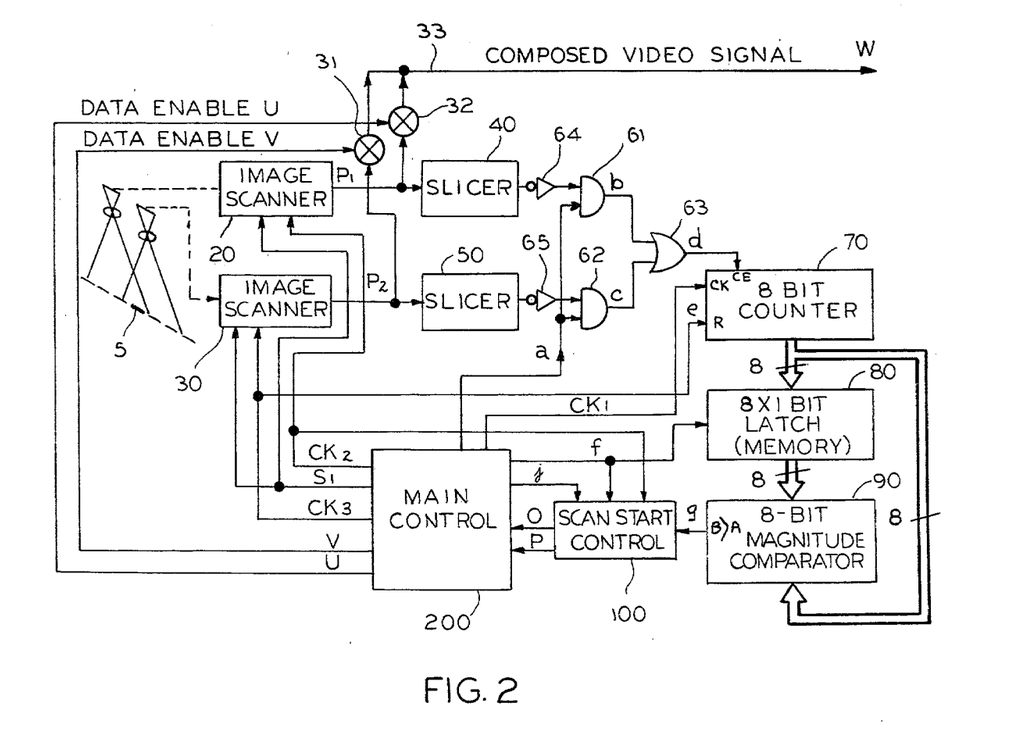
FIG. 2 is a schematic block diagram of the embodiment shown in FIG. 1.

In FIG. 2, the illustrated embodiment of the present invention further includes slicers 40 and 50 which are connected to CCD image scanners 20 and 30, respectively, inverters 64 and 65, AND gates 61 and 62, an OR gate 63, a counter 70, a latch circuit 80, a magnitude comparator 90, a scan start controller 100 and a main controller 200.

Each of the CCD image scanners 20 and 30 includes 2,048 bits of sensor elements. Picture element information is stored in these sensor elements and photoelectrically converted for transfer, all at the same time, to shift registers incorporated in the respective image scanners, upon reception of scan start signals CK2 and CK3, from the main controller 200. An output picture signal is transmitted from each of the CCD image scanners, under control of a shift control signal S1 from the main controller 200, with transfer occuring at the rate of a reference clock pulse signal CK1. The output picture signals are changed into two level signals at respective slicers 40 and 50.

Figure 3:
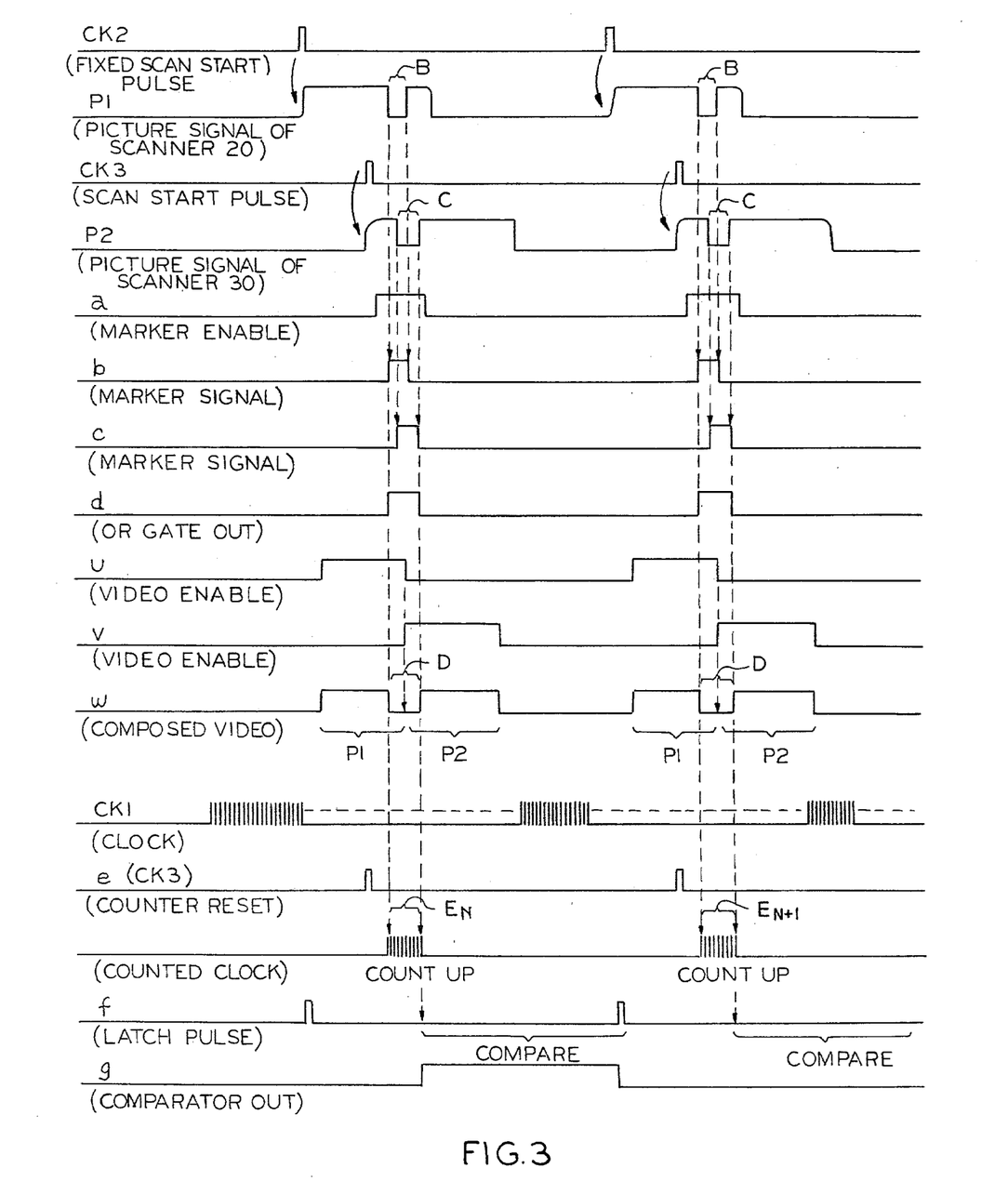
FIG. 3 is a time chart of the signals appearing in the block diagram of FIG. 2.

In FIG. 3, the scan start signal CK2 for CCD image scanner 20 is a pulse signal having rate of repetition corresponding to the one-scan-line perid of 24 msec. Each time this pulse signal CK2 enters the CCD 20, it produces a picture signal P1. As long as the scanning platform 8 (FIG. 1) remains at its starting position, the picture signal P1 (FIG. 3) includes (in each scanner 20 signal segment) a black signal B having a width corresponding to that of the marker 5 on the original supporting table 9. The pulse repetition rate and the pulse width of the scan start signal CK3 for the CCD image scanner 30 is the same as the pulse repetition rate and as the pulse width of the scan start signal CK2. However, signal CK3 is delayed in phase relative to pulse CK2, but to such an extent that each of scan start pulses CK3 occurs before the occurrence of black signal B from the CCD image scanner 20.

Such delay in phase makes it possible for the picture signals of image scanners 20 and 30 to be joined together to form a one-scan-line picture signal for transmission. The picture signal output P2 (FIG. 3) of CCD image scanner 30 (FIG. 1) is started upon reception of a scan start signal CK3. Picture signal P2 also includes in each of the signal segments, a black signal C at a location corresponding to that of the marker 5.

It is to be noted that the output picture signals of the two CCD image scanners can be smoothly joined together without forming any noticeable overlap junction or joint therebetween by setting the scan start signal CK3 in phase relative to the scan start signal CK2. The marker position signals B and C may perfectly coincide with each other on the time axis. Upon leaving the respective slicers 40 and 50 (FIG. 2) the picture signals P1 and P2, are inverted by inverters 64 and 65 and fed to respective input terminals of AND gates 61 and 62. The other input terminals of both of these gates receive a marker enable signal a from the main controller 200.

As seen in FIG. 3, the marker enable signal a is a pulse signal having the same pulse repetition rate as scan start signals CK2 and CK3 and having a much larger pulse width. The width of pulse a is determined by the length of the overlap 15 (FIG. 1) of the scan ranges of the respective CCD image scanners fixed to the scanning platform 8. The phase of marker enable signal a is preset so that the signal a is continually held at its higher level during the time while marker signals B and C are formed. Output signals b and c of AND gates 61 and 62 (FIG. 2) are fed to the OR gate 63. A logical sum signal is obtained at the output of the gate 63, once in each period of scan. In the illustrated embodiment of, it is to be noted that, in the starting position of the scanning platform, the phase of scan start signal CK3 is automatically adjusted to minimize the width or duration of the logical sum signal d, as will be described below in detail.

The 8-bit binary counter 70, (FIG. 2) is fed with signal d (FIG. 3) as an enable signal. Counter 70 counts the number of the pulses of reference clock signal CK1 (FIG. 3), of 300 kHz frequency, which are fed to the counter 70 from the main controller 200. The size of the pulse count is determined according to the width of the logical sum signal d. The reference clock CK1 recurs at the same pulse reputation rate as that rate at which picture elements are outputted from image scanners 20 and 30.

The scan start signal CK3 (FIG. 3), for the image scanner 30 (FIG. 1) is also directed to the counter 70 (FIG. 2) to act as a reset signal e therefor. Thus, the counter 70 is reset immediately, when the image scanner 30 starts to scan. Counter 70 starts to count immediately upon arrival of the enable signal. The output of counter 70 is fed to the 8-bit latch circuit 80 and also to the 8-bit magnitude comparator 90. The latch circuit 80 is fed with latch pulses f, as timing pulses, from the main controller 200. Latch 80 retains the information previously stored therein until a latch pulse arrives and thereafter it retains the counter output existing at the time of the pulse arrival, until the next latch pulse arrives.

Accordingly, the magnitude comparator 90 compares each fresh counter output with that output which was delivered one scan period before. The comparator output g (FIG. 3) rises to its higher level when the count $E_N$ of the fresh counter output is found to be larger than the count that $E_{N-1}$ of the preceding counter output. The comparator output g falls to its lower level upon arrival of the next latch pulse. The latch pulse signal f has the same pulse repetition rate as the scan start signal CK2 and is so phased that each latch pulses appears after the rise to the up-down timing pulse j as will be described later. The comparator output g is applied to the scan start controller 100.

Figure 4:
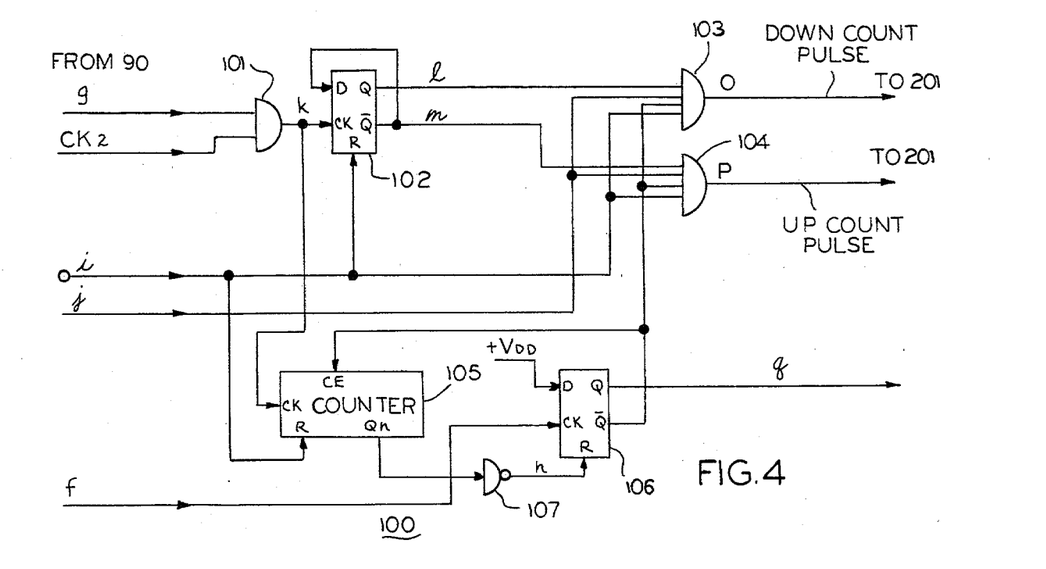
FIG. 4 is a diagram of the logic circuit of the scan start controller shown in FIG. 2.

FIG. 4 shows details of the scan start controller 100, which includes an AND gte 101 connected to receive the comparator output and fixed scan start signal CK2. A D flip-flop 102 is connected to the output of AND gate 101 (flip-flop 102 has an output terminal $\overline{Q}$ connected to the D terminal). The AND gates 103 and 104 are connected to the output terminals Q and $\overline{Q}$ of the D flip-flop 102 to produce up and down count or clock pulses P and O for a presettable counter, as will be described later. The scan start controller 100 further includes a counter 105, another D flip-flop 106 (with its D terminal continually held at a high level), and an inverter 107 in order to adjust the phase of scan start signal CK3 in relation to the fixed scan start signal CK2. The phase may be adjusted a number of times in the vicinity of the optimum phase. These adjustments prevent malfunction.

Figure 5:
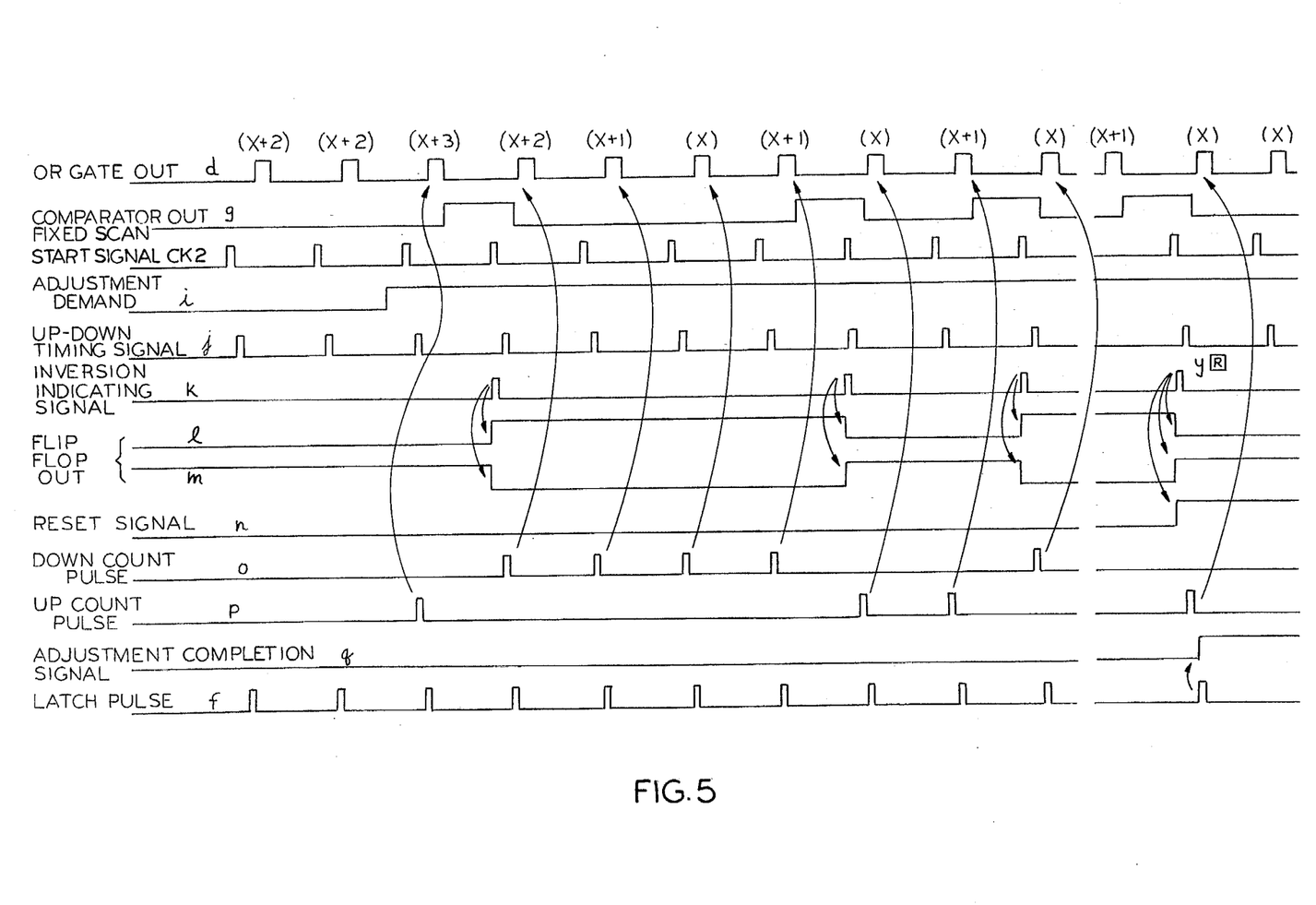
FIG. 5 is a time chart which is explanatory of the operation of the logic circuit shown in FIG. 4.

In FIG. 5, the output signal k of AND gate 101 (FIG. 4) is fed to the D flip-flop 102 and to binary counter 105. The output signal of the D flip-flop 102 is inverted responsive to the arrival of each signal k pulse to produce signals l and m, differing in level from each other. Adjustment demand signal i is switched ON when the start of the adjustment is indicated as the scanning platform 8 (FIG. 1) restores to its starting position. The signal i is a reset signal for the D flip-flop 102 (FIG. 4) and the binary counter 105 and is also fed to the AND gates 103 and 104. Up-down timing pulse signal j has the same frequency as the scan start signal CK2 and is delayed relative thereto by the length of time which is required for an inversion of the D flip-flop.

In short, the pulse signal j (FIG. 5) appears immediately after the occurrence of the clock signal CK2. This pulse signal j is also fed to the AND gates 103 and 104 (FIG. 4), each of which produces a down count signal O or an up count signal P, simultaneously with the up-down timing pulses j when all of the signal inputs to the respective AND gate are ON. An inversion indicating signal or an output signal k, of the AND gate 101, is output therefrom each time that the width of logical sum signal d is increased in the last period of a scan (e.g., say, the signal d increases from $(x+2)$ to $(x+3)$, giving rise to the comparator output g). Accordingly, signals l and m appear at the respective output terminals Q and $\overline{Q}$ of D flip-flop 102 and vary from a low level to a high level and from a high level to a low level, respectively, as illustrated. The output of the D flip-flop 106 latch-type D is held at high level as long as not reset signal n is fed to the flip-flop. This, in turn, holds the AND gate 103 ON to output a down count clock signal O.

As will be described later, in detail, upon the arrival at the main controller 200 (FIG. 2), of each pulse of the down count clock O (FIG. 5), the scan start signal CK3 for image scanner 30 is hastened by an amount corresponding to the length of the period of the reference clock pulse signal CK1. The result is that the width of the logical sum signal d is reduced from $(x+3)$ to $(x+2)$. In this condition, the comparator output never attains its high level. The state of the D flip-flop 102 remains unchanged. The next down count clock O is formed upon the arrival of the up-down timing pulse j. The occurrence of the scan start signal CK3 is further hastened by time corresponding to the length of the period of the reference clock pulse signal CK1. The width of the next logical sum signal pulse d is reduced to $(x+1)$. In this manner, the phase of the scan start signal CK3 (FIG. 3) is advanced each time that a down count clock pulse is produced until the pulse width of the logical sum signal is reduced to its minimum x. Subsequently, the pulse width starts to increase again to $(x+1)$ as the marker signals from the respective image scanners now start to be shifted relative to each other, in the opposite direction. Previously, these signals were perfectly coincident with each other. With the width $(x+1)$ of the logical sum signal, which is larger than the preceding width x, the comparator output is turned ON. The outputs l and m of D flip-flop 102 (FIG. 4) are inverted under the control of inversion indicating signal k. The AND gate 103 is now switched OFF. When an up count clock pulse P (FIG. 5) is produced by the AND gate 104, the phase of the scan start signal CK3 is delayed by an amount of time corresponding to one period length of the reference clock signal CK1. This reduces the width of logical sum signal d to once again become x. However, when with occurrence of the next up count clock pulse, the scan start signal CK3 is further delayed, the width of the logical sum signal d increases again to $(x+1)$. As the result, the comparator output g is again switched ON and the D flip-flop 102 is inverted with an inversion indicating sigal pulse fed thereto.

In this manner, it will be observed that the scan start signal CK3 (FIG. 3) is repeatedly advanced and delayed in phase, in the vicinity of the minimum value x of the logical sum signal pulse width. The number of these clock pulse repetitions is determined by the binary counter 105. Specifically, the counter 105 (FIG. 4) is released from the reset responsive to the adjustment demand signal i (FIG. 5) and then it counts the number of pulses of the inversion indicating signal k until the count reaches $2^n$ and then the counter output is fed to release the reset of the D flip-flop 106. Subsequently, upon arrival of latch pulse f, the output of D flip-flop 106 is inverted so that the up or down count clock output of AND gate 103 or 104 is interrupted. In this manner, the output at the Q terminal of the flip-flop rises to its higher level and the output at the $\overline{Q}$ terminal falls to its lower level. The output signal q from the Q terminal indicates when the adjustment is complete.

Figure 6:
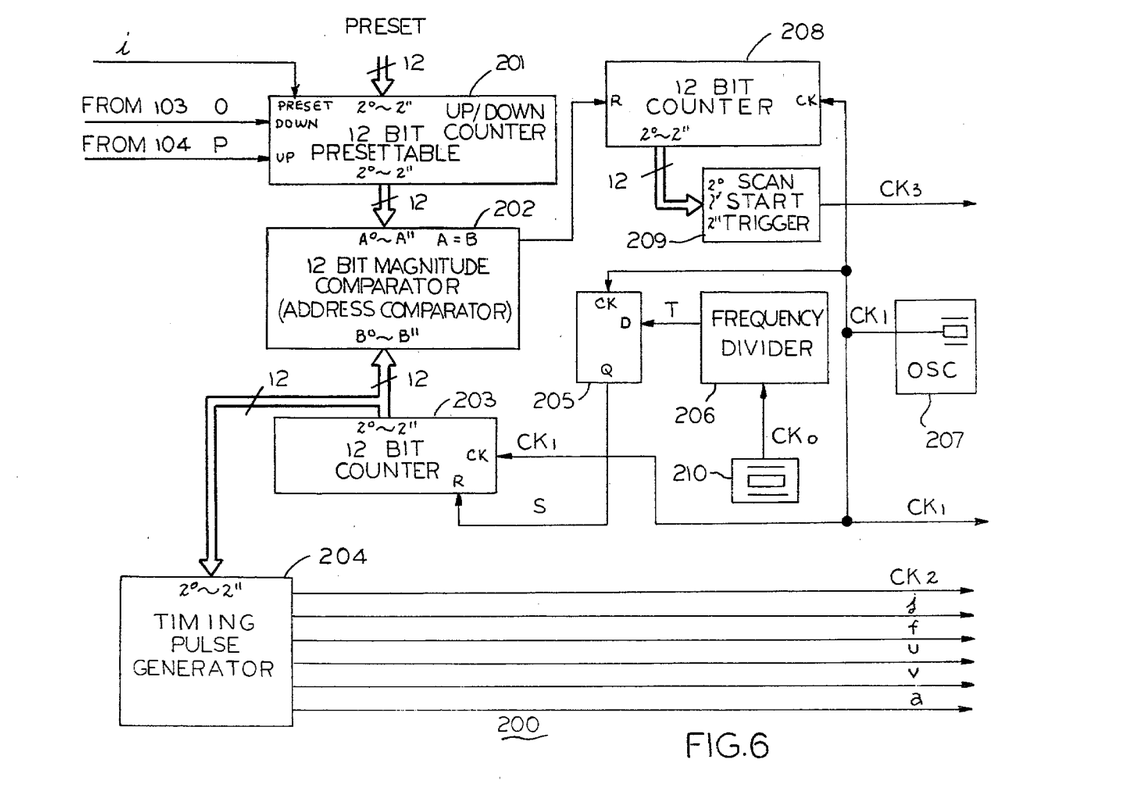
FIG. 6 is a block diagram of the main controller used in the embodiment of the present invention.
Figure 7:
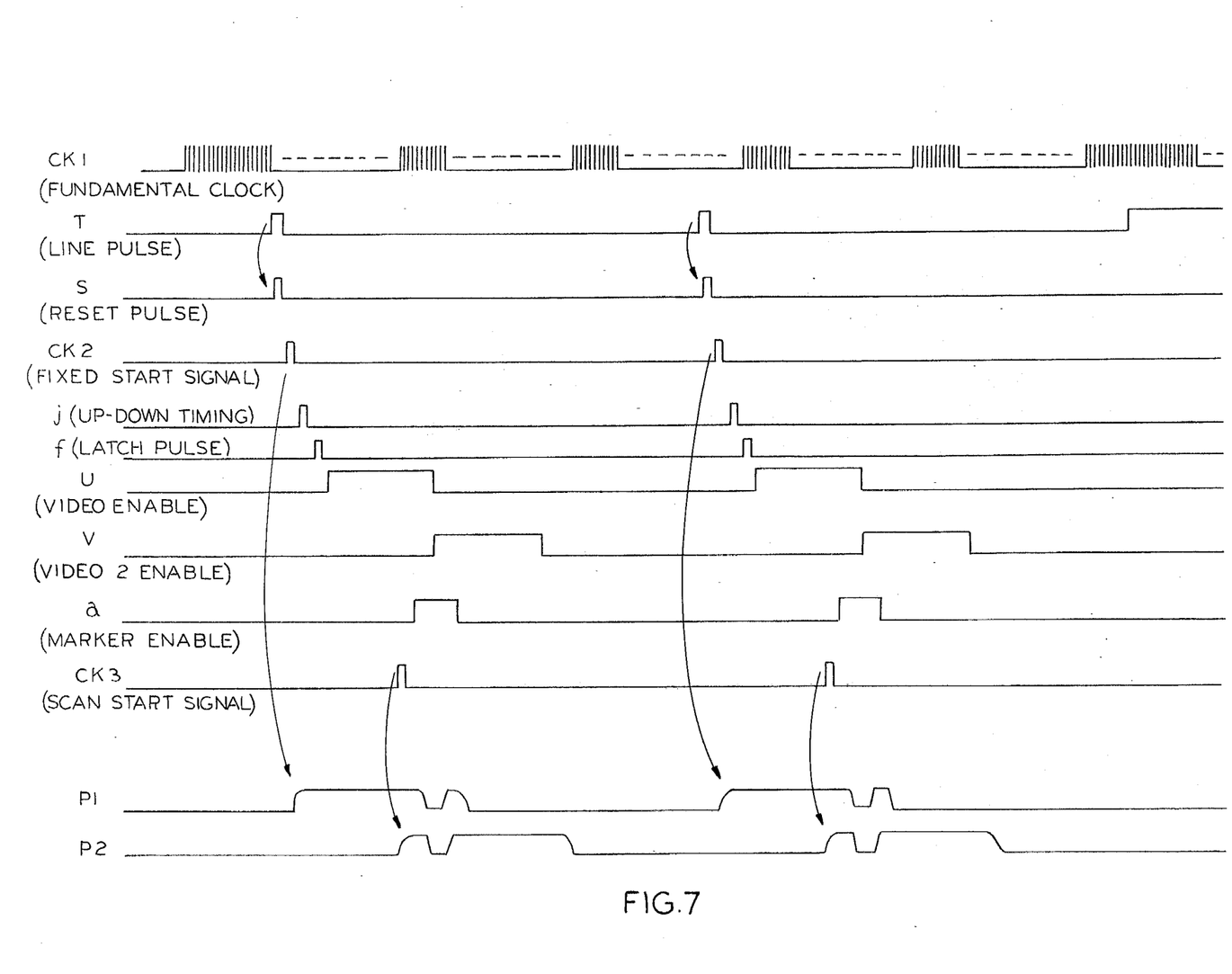
FIG. 7 is a time charge which is explanatory of the operation of the main controller shown in FIG. 6.

The next description will be made with reference to FIGS. 6 and 7, to explain the manner in which different control signals are produced by the main controller 200 and other components.

The fundamental or reference clock signal CK1 of 300 kHz frequency is produced by a crystal oscillator 207 and is applied to a synchronizing differentiation circuit 205 and two 12-bit binary counters 203 and 208. The clock signal $CK_0$ of 149.25 kHz is generated at another crystal oscillator 210 and is applied to a frequency divider 206 to produce a line pulse signal T. The frequency divider 206 generates one line pulse each time that the full count of 3,582 is reached. The length of a period of the line pulse signal represents picture signal segments for each of the image scanners employed, corresponding to the period of each combined one scan line.

The synchronizing differentiation circuit 205 produces a reset pulse signal S as the differential of line pulse T, in synchronism with the clock pulse CK1. A 12-bit binary counter 203 counts the clock pulses CK1 and is reset once every 24 msec. A 12-bit magnitude comparator 202 compares the output of binary counter 203 with that of a 12-bit presettable up-down counter 201. Comparator 202 produces a reset pulse for another 12-bit binary counter 208 each time that the outputs of the binary counter 203 and the up-down counter 201 are found to be identical. The binary counter 208 counts, reference clock pulses CK1 and. A scan start signal pulse CK3 is produced once every 24 msec period, by a scan start trigger circuit 209. The phase of the scan start signal CK3 is adjusted by adjusting the reset signal for the binary counter 208.

The up-down counter 201 is presettable for an address corresponding to the spatial arrangement of the image scanners. The phase of the scan start signal CK3 is variable as the preset address of the up-down counter varies under the command of up or down clock P or O, such as previously described with reference to FIGS. 4 and 5.

The output of binary counter 203 is also fed to a timing pulse generator 204, thereby enabling it to produce different timing pulse signals, which are fixed in phase relation. Specifically, the pulse generator 204 produces scan start signal CK2 for image scanner 20 (FIG. 1) one every 24 msec perid. Similarly, up-down timing signal j, latch pulse signal f and marker enable signal a, all previously referred to, are produced. These signals j, f, a have a period which is the same length as the period of the scan start signal CK2, but these signals are different from signal CK2 in phase and in pulse width.

In addition to these signals j, f, a, data enable signals U and V are also produced by the timing pulse generator 204. Signals U and V are directed to analog switches 31 and 32 (FIG. 2), which are provided for combining the video signals from image scanners 20 and 30 (FIGS. 1, 2; see also FIG. 3). The data enable signal U is formed of pulses, one for each scan period, arising when 220 clock pulses have been counted after the start of scan start signal CK2 and ending when a further 1,698 clock pulses have been counted. On the other hand, the other data enable signal V is formed of pulses, each of which arises when the data enable signal U disappears (or becomes OFF) and terminates when a further 1,698 clock pulses have been counted.

In this manner, an analog switch 32 (FIG. 2) receives a train of data in the range of 1,698 bits starting from the 221st bit taken out of the CCD image scanner 20. Similarly, data for the succeeding 1,698 bits are taken out of the CCD image scanner 30 via another analog switch 31. It is thus to be noted that the video signal for an original copy (e.g., wide on a copy medium of the A3 size (ISO standard), is represented by 3,396 bits of picture elements for each main scan.

In a non-minimal width of logical sum signal d (FIG. 3), the video signal W includes black signal portions D which are wider than the black signal portions B (C) of the output signals P1 and P2 of the respective image scanners 20 and 30. This excess width causes a doubling of the picture signal at the joint between signal segments. If the phase of the scan start signal CK3 is excessively advanced, there is a gap in the picture signal at the joint.

it is to be noted, however, that, once an automatic phase adjustment of the scan start signal CK3 has been completed to minimize the pulse width of the logical sum d, as described hereinbefore, a video signal is obtainable for the original copy, which signal continues smoothly with no doubling or gap of the picture signal appearing at the joints.

In this connection, in the start position of the scanning platform, if the scan start signal CK3 has been automatically adjusted in phase to minimize the width of the logical sum signal d, with the aid of the reference marker signal, an auxiliary scanning is ordered to start by an adjustment completion signal q. At the same time, the transmission of the composed picture signal is started (FIG. 2).

The composed picture signal is alternately distributed, line by line, to a pair of line memories. The stored picture signal is alternately read out, with a result that the rate conversion is effected for each of the line memories. The phase signal for synchronism is inserted after the read-out from the line memories in an ordinary manner.

For an optimal phase adjustment of the scan start signal CK3, it is desirable to make the correction indication or adjustment demand signal i switch ON automatically each time when the scanning platform 8 (FIG. 1) has been restored to its starting position, upon a completion of the transmission of each original copy. It will be apparent, however, that, once the phase adjustment has been effected, any desired number of original copies may be transmitted consecutively before the adjustment demand signal is again produced for readjustment, as needed.

In the embodiment described above, the marker is shown as being arranged directly on the original supporting table. However, it may also be arranged in a space entirely separate from the table with the use of an optical system adapted to focus the image of such a marker on the CCD image scanners at the time when a picture seam correction is required.

Further, it will be apparent that, although the scanning platform 8 in the embodiment illustrated, has been described as movable in the direction of the auxiliary scan, it may be fixed and the original supporting table 9 may be made movable in that direction.

The embodiment illustrated includes a combination of two CCD image scanners as described. However, it will also be apparent that seam correction may be effected in substantially the same manner even where three or more of CCD image scanners are employed.

It is to be understood that, according to the principles of the present invention, satisfactory results are obtainable with a use of solid-state image scanners of any type other than the CCD.

What is claimed is:

1. A facsimile scanner comprising first and second image area scanner means for scanning an image area with an overlapped scan region to produce first and second analogue output signals, respectively, with first and second distinctive signals of a common duration included in said first and said second output signals, respectively, when said overlapped scan region includes a marker means for performing a logical sum of the durations of said first and second distinctive signals, and means responsive to said first and said second distinctive signals for adjusting said output signals in order to minimize the logical sum of the durations of said first and said second distinctive signals.

2. The scanner of claim 1 and means for generating scan start signals for the respective scanner means, and means for automatically adjusting the phase relationship of said scan start signals to minimize the logical sum.

3. The scanner of claim 2 wherein said marker is printed on said image area.

4. The scanner of claim 2 wherein said marker is an optical image projected onto said image area from an actual marker located apart from said image area.

5. The scanner of either claim 3 or claim 4 wherein each of said scanner means is a solid-state device which generates the analogue output signal responsive to light variations picked up in said image area, and clock pulse source means for reading out said analogue output signals to provide sequential signal trains responsive to each scan line of said image area.

6. In a facsimile or similar apparatus of the type comprising means for producing a plurality of scan start signals which have the same repetition rate with an adjustable phase difference therebetween, first and second solid-state image scanners responsive to first and second of said scan start signals, respectively, for scanning an image area with an overlapped scan region to successively produce first and second analogue image signal segments, respectively, first and second marker signals of a common duration included in response to a density marker in said overlapped scan region in said first and said second image signal segments, respectively, and adjusting means responsive to said first and said second marker signals for adjusting the phase difference which said second scan start signal has relative to sid first scan start signal, said adjusting means adjusting the last-mentioned phase difference to make said first and said second image signal segments represent said image area with neither a doubling nor a gap of image signals occurring between said first and said second image signal segments, said adjusting means comprising:

first means for separating said first and said second marker signals from said first and said second image signal segments to produce those first and second separated signals, respectively, which have durations substantially equal to said common duration;

second means responsive to said first and said second separated signals for producing a sum signal which has a sum duration starting at the beginning of the duration of said first separated signal and ending at the end of the duration of said second separated signal; and third means responsive to said sum signal for adjusting the last-mentioned phase difference to minimize said sum duration, whereby said first and said second image signal segments are made to represent said image area with neither the doubling nor the gap of image signals.

7. A facsimile or similar apparatus as set forth in claim 6, wherein said third means comprises:

fourth means responsive to said first scan start signal and the sum signals produced for successive scan lines on said image area for comparing the sum duration for a first of said scan lines with the sum duration for a second of said scan lines that next succeeds said first scan line, said fourth means producing a comparison result signal that usually has a first level and varies to a second level when the sum duration for said second scan line is longer than the sum duration for said first scan line, said comparison result signal having said second level only during one of said scan lines that next succeeds the last-mentioned scond scan line; and fifth means responsive to said comparison result signal for adjusting the last-mentioned phase difference each time when said comparison result signal varies from said first level to said second level.

8. A facsimile or similar apparatus as set forth in claim 7, wherein said fourth means comprises:

means responsive to said first scan start signal for producing latch pulses for the respective scan lines;

means responsive to each latch pulse for latching the sum duration of each scan line until production of one of said latch pulses that next follows each latch pulse; and comparator means responsive to said latch pulses for comparing the sum duration for a current scan line with the sum duration latched in response to the latch pulse produced for one of said scan lines that next precedes said current scan line, said comparator means producing said comparison result signal with said first level varied to said second level when the sum duration for said current scan line is longer than the latched sum duration, said comparison result signal being kept at said second level until a production of a latch pulse for one of said scan lines that next succeeds said current scan line.

9. A facsimile or similar apparatus as set forth in claim 7, wherein said fifth means comprises:

means for producing an adjustment enable signal when the scan lines intersect said density marker;

means responsive to said adjustment enable signal, said first scan start signal, and said comparison result signal for producing up and down count pulses, one up or down count pulse for each scan line, with the up count pulse produced at first and with the up and the down count pulses interswitched in response to each variation of said comparison result signal from said first level to said second level; and means responsive to said up and said down count pulses for delaying and advancing said second scan start signal relative to said first scan start signal, respectively.

10. A facsimile or similar apparatus as set forth in any one of claims 6, 7, 8, 9, further comprising means responsive to said first scan start signal for concatenating said second image signal segments to the respective first image signal segments to produce a facsimile or similar signal representative of said image area.

11. A facsimile or similar apparatus as set forth in any one of claim 6, 7, 8, 9, said first and said second marker signals having a common level that has a level difference relative to those portions of said first and said second image signal segments which are adjacent to said first and said second marker signals, respectively, wherein said first means comprises:

means responsive to said first scan start signal for producing a gate enable signal;

means for separating said first and said second marker signals from said first and said second image signal segments in response to said level difference to produce first and second intermediate signals, respectively, said first and said second intermediate signals having a duration in common that is substantially equal to said common duration; and means responsive to said gate enable signal for gating said first and said second intermediate signals into said first and said second separated signals, respectively.

* * * * *

UNITED STATES PATENT AND TRADEMARK OFFICE
CERTIFICATE OF CORRECTION

PATENT NO. : 4,358,794                      Page 1 of 2
DATED      : NOVEMBER 9, 1982
INVENTOR(S): NAOKI KURAKAMI, et al.

It is certified that error appears in the above—identified patent and that said Letters Patent is hereby corrected as shown below:

Col. 1, Line 19, change "scane" to --scan;

Col. 2, Line 44, change "charge" to --chart--;

Col. 3, Line 6, insert --that-- after "time";

Col. 3, Line 35, insert --a-- after "having";

Col. 3, Line 36, change "perid" to --period--;

Col. 3, Line 51, insert --a-- after "Such";

Col. 4, Line 15, insert --Fig. 1-- after "of" (2nd occurrence);

Col. 4, Line 20, delete the comma ",";

Col. 4, Line 48, delete "that";

Col. 5, Line 34, insert --latch type-- before "D"; delete "latch-";

UNITED STATES PATENT AND TRADEMARK OFFICE
CERTIFICATE OF CORRECTION

PATENT NO. : 4,358,794
DATED : NOVEMBER 9, 1982
INVENTOR(S) : NAOKI KURAKAMI, et al.

It is certified that error appears in the above—identified patent and that said Letters Patent is hereby corrected as shown below:

Col. 5, Line 35, delete "type D";

Col. 5, Line 35, insert --a-- after "at";

Col. 5, Line 35, change "not" to --no--;

Col. 5, Line 53, begin a new paragraph at "In";

Col. 6, Line 9, change "sigal" to --signal--;

Col. 6, Line 57, delete "and";

Col. 7, Line 6, change "perid" to --period--;

Col. 7, Line 33, insert --283 mm-- after "e.g.,".

Column 9, line 8, change "sid" to -- said --.

Signed and Sealed this

Fifteenth Day of March 1983

[SEAL]

Attest:

GERALD J. MOSSINGHOFF

Attesting Officer          Commissioner of Patents and Trademarks